United States Patent
Ende

[15] 3,669,500
[45] June 13, 1972

[54] BALANCE WEIGHT FOR VEHICLE WHEELS

[72] Inventor: Kurt Hans Dietrich Ende, Onstmettingen, Wurttemberg, Germany

[73] Assignee: Dionys Hofmann, Maschinenfabrik GmbH, Onstmettingen, (Wurttemberg), Germany

[22] Filed: Dec. 23, 1969

[21] Appl. No.: 887,794

[30] Foreign Application Priority Data

Dec. 23, 1968  Germany...................P 18 16 669.3

[52] U.S. Cl.............................................301/5 B, 29/243.56
[51] Int. Cl.............................................B60b 13/00
[58] Field of Search.....................................301/5 B

[56] References Cited

UNITED STATES PATENTS

| 2,548,842 | 4/1951 | McCrorey | 301/5 B |
| 2,248,265 | 7/1941 | Wright | 301/5 B |
| 2,122,065 | 6/1938 | Hume | 301/5 B |

FOREIGN PATENTS OR APPLICATIONS

| 1,235,022 | 5/1960 | France | 301/5 B |
| 838,857 | 6/1960 | Great Britain | 301/5 B |

*Primary Examiner*—Richard J. Johnson
*Attorney*—Cushman, Darby & Cushman

[57] ABSTRACT

A balance weight with a separate and adjustable holding clip for balancing vehicle wheels. The balance weight is comprised of a balance weight piece and an adjustable holding clip which is interconnected to the balance weight piece.

3 Claims, 7 Drawing Figures

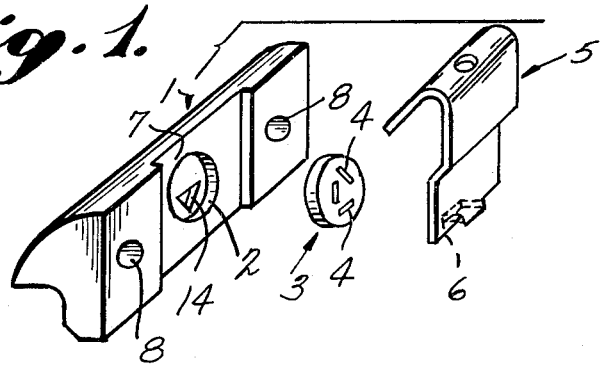
Fig. 1.
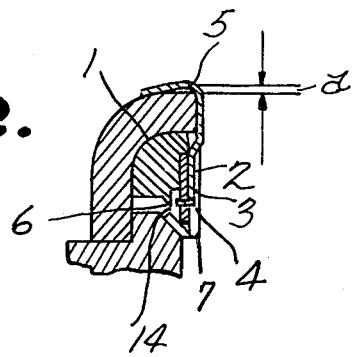
Fig. 2.
Fig. 3
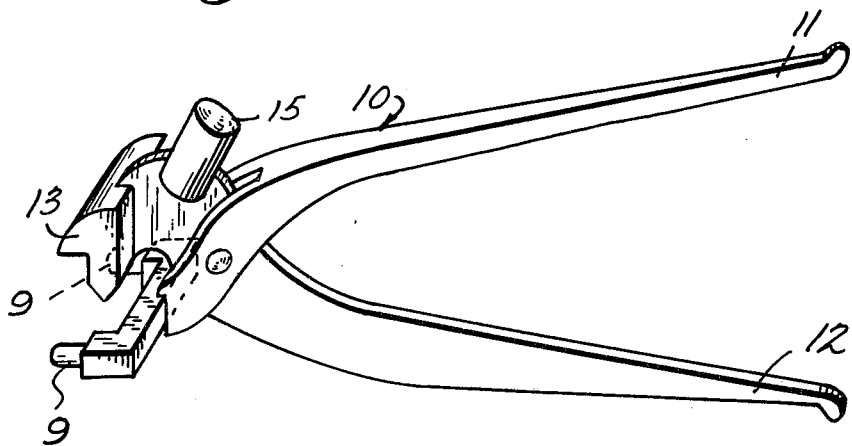
INVENTOR
KURT HANS DIETRICH ENDE
BY Cushman Darby & Cushman
ATTORNEYS

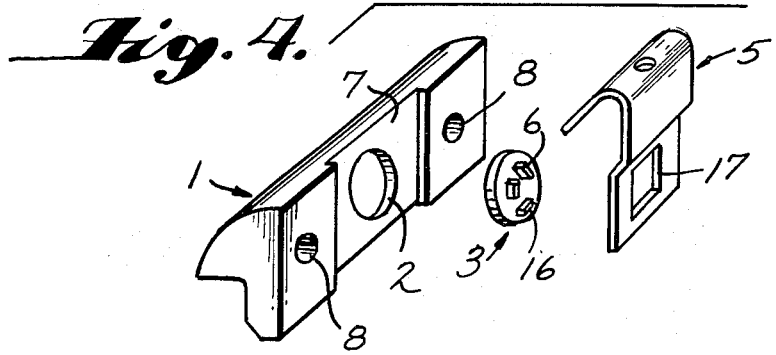
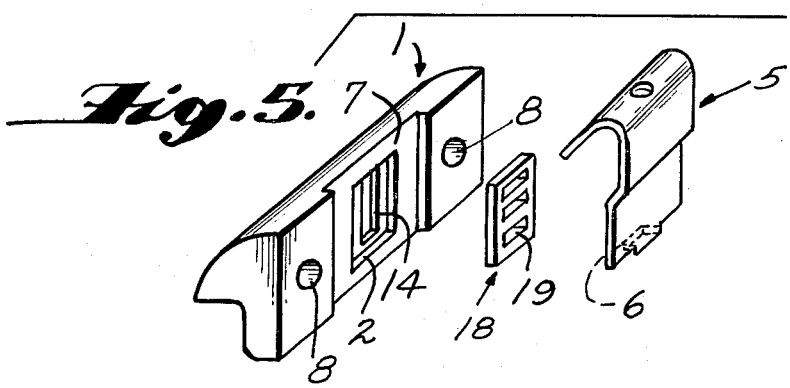
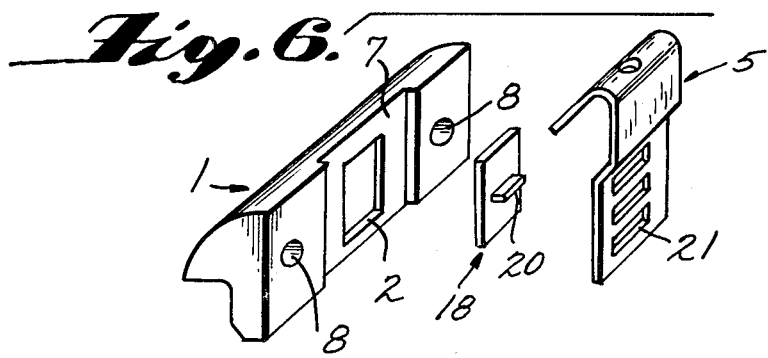
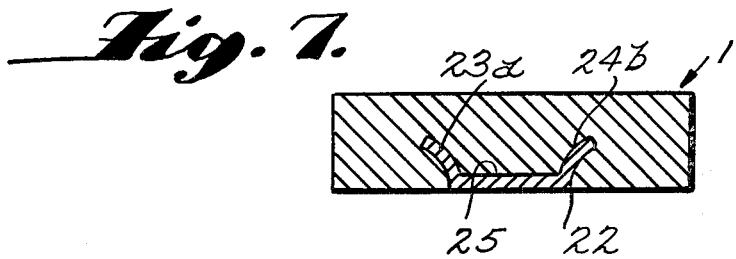

BALANCE WEIGHT FOR VEHICLE WHEELS

A well balanced vehicle wheel is a matter of great importance as an unbalanced wheel affects the life of the vehicle tire, the steering gear and moreover the course of motoring. When a wheel is unbalanced heavy vibrations and oscillation develop during certain speed ranges which on one hand impair the safety of the vehicle on the road and on the other hand cause early wear of the steering mechanism and bearings. In order to prevent these adverse effects, the vehicle wheels are balanced by the application of balance weights which compensate for the unbalance present in the wheel. These weights for balancing are composed of a lead weight with a matching holding clip. Usually, the holding clip is firmly anchored in the lead weight and the weights are knocked in the rim flange by a hammer blow.

A number of difficulties arise in connection with the use of balance weights having an integral holding clip, as, for example, if the rim flanges show much difference in thickness which occurs in commercial vehicle wheels, or if the tire extends far up toward the edge of the rim flange. Either of these cases requires the availability of a large assortment of balance weights provided with holding clips suited for the specific rim flange thicknesses. There is a danger that after driving the balance weights on the rim flange edge, the initial tension of the holding clip is reduced to such an extent that the balance weights are no longer firmly and safely located on the rim. The thickness variation of rim flanges has been overcome by the use of holding clips with longer branches, the additional length of the clip branches being intended for providing a certain tolerance range. This, however, involves the disadvantage that the balance weights with longer branches of the holding clips can only be fixed by means of additional tire compressing means.

In order to eliminate these disadvantages, it has become practice in part to use balance weights with a separate holding clip which are not united until they are secured on the rim. The standard procedure of this practice is to press one branch of the holding clip against the outside of the rim flange and to slide the second branch of the holding clip over the balance weight, abutting the inside of the rim flange to cause the weight to be pressed resiliently against the inside of the rim flange by the holding clip. In order to make allowance for the varying thickness of the rim flanges, the holding clip is made adjustable in relation to the balance weight with screws or rivets joining the holding clip with the balance weight. With the screw connection, the holding clip is united with the lead weight by means of wood screw-shaped screws which are pressed through one of several cut-outs in the holding clip according to the thickness of the rim flange and screwed into the lead weight piece to facilitate an adjustment of the holding clip in relation to the balance weight piece. In the case of the rivet-like connection, an oblong hole is provided in the holding clip which engages a salient pin of the balance weight. The oblong hole permits an adjustment of the holding clip in relation to the balance weight adaptation to different thicknesses of the rim flanges. The balance weight and holding clip are united by upsetting the end of the salient pin similar to a rivet.

The last-mentioned balance weights with a separate and adjustable holding clip, however, have not proven useful in practice inasmuch as during longer periods of operation a firm union is not assured. The reason the firm union is not assured is that the holding clips of hard steel engage directly with the balance weights of soft lead, the zone of contact being small so that a deformation of the lead and its resultant loosening are inevitable.

Proceeding from such prior art, it is the object of the present invention to remove the mentioned disadvantages and to propose an improved balance weight with a separate, adjustable holding clip which is adaptable to different thicknesses of the rim flange and assures a firm union with the rim flange even during extended periods of operation. According to the invention, this problem is solved in that the balance weight piece and the holding clip are interconnected by means of an insert. This construction offers the advantage in that all deformations of the soft lead are avoided as the holding clip has no direct contact with the balance weight piece of soft lead, but only through the insert. The insert, however, has a large area of contact with the lead balance weight piece whereby surface pressure is reduced and the risk of possible deformations and consequential loosening avoided. The surface pressure in the zone where the insert and the holding clip make contact, is considerably higher, as the insert which may be of hard material such as steel, has a very high degree of resistance to deformation in the same way as the holding clip of steel. When using the balance weight piece with matching holding clip according to the invention, there is no risk whatever that the balance weights after their fitting to the rim flange will come loose and displace themselves.

The union between the balance weight piece and the insert on one hand and the union between the insert and the holding clip on the other hand can be designed in a different way. The insert is preferably positively fitted in a recess of the balance weight. The insert may be either firmly pressed in this recess or revolve in it. Another possibility is to cast the insert integral with the recess of the balance weight.

It is advantageous if the union between the insert and the holding clip is designed as positive union. For this purpose, the insert can be provided with one or several cut-outs or have one or several tooth-like projections. Accordingly, when the insert has cut-outs or tooth-like projections, the holding clip is provided with one or several tooth-like projections or one or several cut-outs. The provision of several projections and cut-outs, respectively, on the insert or the holding clip offers the advantage that one and the same balance weight piece with matching holding clip and insert covers a relatively large range of different thicknesses of rim flanges. This is a main consideration in the balancing of commercial vehicle wheels as rim flanges are encountered of greatly varying thickness. Therefore, the use of the balance weight according to the invention renders it possible to reduce considerably the inventory items required.

According to a preferred embodiment, the recess in the balance weight piece is in the form of a circle, and the inset is a circular disk of much the same diameter.

In another embodiment, the cut-outs in the circular disc are in the form of rectangular slots.

In yet another embodiment, the balance weight piece has two blind holes with which engage two pin-like projections of pliers for application of the balance weight.

It is advantageous if the balance weight has a depression which accommodates positively one branch of the holding clip when being clipped into place.

Further particulars and features of the invention appear from the following description with reference to the accompanying drawings in which:

FIG. 1 is a perspective representation of the balance weight piece with insert and holding clip taken apart in exploded view;

FIG. 2 is a cross-sectional view of a rim flange with a balance weight fixed thereon;

FIG. 3 is a perspective representation of pliers according to the invention used for the application of the balance weight;

FIG. 4 is a perspective exploded view of a another embodiment of the balance weight piece with insert and holding clip;

FIG. 5 is a perspective exploded view of yet another embodiment of the balance weight piece with insert and holding clip;

FIG. 6 is a perspective exploded view of still another embodiment of the balance weight piece with insert and holding clip; and FIG. 7 is a cross-sectional view of a representative example of a balance weight with integrally cast insert.

The invention, as shown by FIG. 1 represents a balance weight piece 1 having one side adapted in form and shape to the contour of a rim flange. A circular recess 2 is substantially centered on the opposite side of the balance weight piece 1. This circular recess 2 serves to accommodate a circular insert or disc 3 of nearly corresponding and advantageously slightly smaller diameter.

The circular insert or disc 3 is provided with a plurality of rectangularly shaped slots 4 which are suitably positioned on the insert.

The rectangular-like slots 4 are so arranged on the insert or disc 3 that they are unevenly spaced from the center of the insert. Each slot 4 is coordinated with a number in such a manner that a slot marked with a higher number is more distant from the center of the disc than a slot marked with a lower number.

A holding clip 5 shaped similar to a conventional holding clip, is used to clip on the balance weight piece 1. The lower part or lower branch of the holding clip 5 is provided with a tooth-like projection 6 which is intended to be engaged with the slots 4 in the circular insert 3.

As can be seen from FIG. 1, the circular recess 2 is located in the zone of a depression 7 which serves to positively accommodate the lower branch of the holding clip 5 in clipped-on condition. Circular blind holes 8 are worked into the balance weight piece 1 to the sides of the depression 7 for accommodation of two cylindrical pins 9 of pliers 10, as shown in FIG. 3, for the application of the balance weight piece 1 and the holding clip 5 to the wheel flange. The two cylindrical pins 9 of the pliers are located on a lever 11 of the pliers 10 while another lever 12 is combined with a fitting piece 13, the form and shape of which is adapted to the contour of the holding clip 5. The fitting piece 13 is either a magnet or provided with a magnet for holding the clip 5 when being applied to the wheel flange.

It can be seen from FIG. 2 that within the zone of the circular recess 2 a smaller recess 14 penetrates into the interior of the balance weight piece 1. The foremost end of the tooth-like projection 6 will project within recess 14 when the length of the tooth-like projection 6 exceeds the thickness of the circular insert or disc 3.

The balance weight piece of the invention with the separate and adjustable holding clip is fixed in the following manner.

The holding clip 5 is made to abut the underside of the fitting piece 13 of pliers 10, which may be magnetic or have a separate magnet, and is held in that position by the effect of the magnet. The balance weight piece 1 together with the circular insert or disc 3 located in the recess 2 is pushed on the two cylindrical pins 9 which engage with the blind holes 8. The slots 4 of the circular insert or disc 3 are oriented as necessitated by the thickness of the rim flange. The balance weight piece 1 and the holding clip 5 are placed on the rim flange by means of the pliers 10 and firmly anchored to the rim flange by pressing together the two levers 11 and 12 causing the tooth-like projection 6 of the holding clip 5 to engage audibly with the previously adjusted slot 4 in the circular insert or disc 3. In the final operation, the holding clip 5 together with the balance weight piece 1 is definitively placed in position by means of a knob 15 fitted to the fore end of the lever 12 of the pliers 10 by using it as a beating tool.

The distance a, as shown in FIG. 2, should on this occasion not be more than 2 mm. If this is not the case, adjustment must be made to the next higher numbered slot 4 in the insert or disc 3. Following the distribution and arrangement of the slots 4 in the circular insert or disc 3 as represented in the drawing, the same balance weight piece and the same holding clip can be used for different thicknesses of rim. The uniform spring tension required for the safe clip-on is assured in all cases as different thicknesses of rim are compensated by the suitable adjustment of the insert or disc 3 with the slots 4 provided therein. There is no risk, therefore, that the clip is overstrained and in such a case plastically deformed or is too loose which also would impair the required clamping effect. In this way, it is possible to use a balance weight piece according to the invention with a holding clip according to the invention for rims ranging from 4 to 10 mm in thickness which is a main consideration in the balancing of commercial vehicle wheels.

The invention offers the advantage that the assortments and the stock-keeping of balance weights can be considerably reduced. Another advantage can be seen in the fact that the circular insert or disc 3, which combines the balance weight 1 with the holding clip 5 has a large surface of contact in relation to the lead balance weight 1 which is a very favorable condition as lead is relatively soft and in the case of a small contact surface a danger of deformations of the lead weights caused by the clamping forces develops which could result in a loosening of the union as is also experienced when using the conventional balance weights and holding clips. The pliers according to the invention further offer the advantage of a very fast application and fixing of the balance weights.

As a modification of the previously described preferred embodiment shown in the drawing, it can also be considered to provide the insert with projections in the place of slots in which case the holding clip would have a cut-out instead of the tooth-like projection for engagement with the projections of the insert when being clipped on. It is further possible to parallel arrange the slots in the insert and thus change the distribution of slots shown in the drawing. If desired, a noncircular insert or disc of another form and shape can be used for which the recess in the balance weight piece must have a corresponding form and shape.

Further embodiments are diagrammatically represented in the FIGS. 4 through 7 of the drawing, the reference numerals for the corresponding parts when possible being the same as in FIGS. 1 through 3.

FIG. 4 shows a balance weight having an insert 3 designed as circular disc which is revolvingly fitted in the circular recess 2 of the balance weight piece 1. The insert 3 has several tooth-like projections 16 which can be engaged with one or more slot-like cut-outs 17 in the holding clip 5.

FIG. 5 shows a loosely fitted non-revolving insert 18 of rectangular shape which is fitted in the rectangular shaped recess 2 of the balance weight piece 1. The insert 18 has several rectangular slot-like cut-outs 19 parallel to each other while the holding clip 5 is provided with a tooth-like projection 6.

FIG. 6 shows a rectangular insert 18 having a tooth-like projection 20 which is fitted positively in a rectangular recess 2 in the balance weight piece 1. The holding clip 5 is provided with several parallel cut-outs 21.

FIG. 7 shows an insert 22 with tooth-like projections 23 and 24 and several parallel cut-outs 25. The insert 22 is integrally cast with the balance weight piece 1.

The balance weights according to FIG. 1 and 4 through 6 enable a low inventory of balance weights to be kept and are economical to produce. The embodiment of FIG. 7 is also economical to manufacture. FIG. 7's embodiment is particularly advantageous in that fixing the balance weight on the rim requires only two parts to be united as the insert is integrally cast with the balance weight piece. In contrast with the balance weights according to FIG. 1 and 4 through 6, however, a somewhat larger inventory must be kept.

According to the requirements of the application, numerous modifications of the previously described and preferred embodiments shown in the drawing are possible. Such modifications concern mainly the form of the insert as well as the number and form of the slot-like cut-outs and the tooth-like projections engaging therewith. An additional modification using holding clips of different length is also envisioned which is advantageous particularly in the case of integrally cast inserts. It is possible, however, to use integrally cast inserts of different size for different thicknesses of rim flange.

What is claimed is:

1. A balance weight for vehicle wheels having rim flanges, comprising a weight portion, a holding clip adapted for extending over said rim flange, and an insert means for joining said weight portion to said holding clip wherein said weight portion contains a recess and said insert means comprises a member adapted to be removably received within said recess and said insert means is provided with at least one recess at a position off the center of said insert means so that the position of said recess in said insert means with respect to said weight portion may be changed by removing said insert means, reorienting said insert means with respect to said weight portion and replacing said insert means within said weight portion, said holding clip being provided with at least one projection adapted to be received within the recess of said insert means.

2. A balance weight as claimed in claim 1 wherein said recess in said weight portion has a circular circumference and said insert means comprises a circular disc adapted to be received within said recess in a loosely revolvable manner.

3. A balance weight as claimed in claim 2 wherein said insert means comprises a plurality of recesses which are arranged at various spacings from the center of said insert means.

* * * * *